(12) United States Patent
    Shintani

(10) Patent No.: US 8,913,198 B2
(45) Date of Patent: *Dec. 16, 2014

(54) CONTROLLING DISPLAY SETTINGS USING MOBILE DEVICE

(71) Applicant: Sony Corporation, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,845

(22) Filed: Aug. 1, 2013

(65) Prior Publication Data

US 2013/0314609 A1    Nov. 28, 2013

Related U.S. Application Data

(63) Continuation of application No. 13/313,237, filed on Dec. 7, 2011, now Pat. No. 8,610,835.

(51) Int. Cl.
| | |
|---|---|
| *H04N 5/44* | (2011.01) |
| *H04N 5/57* | (2006.01) |
| *H04N 21/422* | (2011.01) |
| *H04N 21/431* | (2011.01) |
| *H04N 21/485* | (2011.01) |

(52) U.S. Cl.
    CPC ............... *H04N 5/57* (2013.01); *H04N 21/422* (2013.01); *H04N 21/431* (2013.01); *H04N 21/485* (2013.01)
    USPC .............. 348/734; 348/552; 725/37; 715/722

(58) Field of Classification Search
    CPC ... H04N 5/44; H04N 5/4403; H04N 5/44582; H04N 5/4401
    USPC ................ 348/734, 552, 553; 725/44, 37, 38; 715/740, 716, 722
    See application file for complete search history.

(56) References Cited

U.S. PATENT DOCUMENTS

| | | | |
|---|---|---|---|
| 2004/0008287 A1* | 1/2004 | Johnston et al. | 348/734 |
| 2004/0066308 A1* | 4/2004 | Sampsell | 340/825.69 |
| 2006/0282867 A1* | 12/2006 | Mizuhashi et al. | 725/105 |
| 2008/0151126 A1* | 6/2008 | Yu | 348/734 |
| 2008/0178224 A1* | 7/2008 | Laude et al. | 725/44 |

* cited by examiner

*Primary Examiner* — Michael Lee
(74) *Attorney, Agent, or Firm* — John L. Rogitz

(57) ABSTRACT

A mobile settings control device (MSCD) presents a user interface (UI) enabling a user to establish display settings for a display associated with an audio video display device (AVDD) with which the MSCD communicates. Before and after adjustment screen shots may be presented full screen and toggled between on either the AVDD or MSCD, or split screens of before and after adjustment screen shots can be presented side by side on the AVDD or MSCD.

25 Claims, 4 Drawing Sheets

FIG.3
SETTINGS
- USE LOAD DEVICE
- USE MOBILE DEVICE
FIG.4
SHOW COMPARISON SCREENS ON:
- TV
- MOBILE DEVICE
FIG.6
FOR COMPARISON SCREENS, USE
- FREEZE FRAMES
- LIVE VIDEO
- FRAME I.D.
FIG.5
- SPLIT SCREEN
- ALTERNATING FULL SCREENS
- I WILL TOGGLE
- TOGGLE @___ SECONDS
FIG.7
DRAG BIAS TO INCREASE/DECREASE CURRENT
COLOR 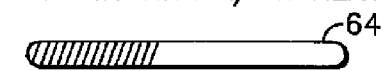   40
BRIGHTNESS    20
CONTRAST    80
BEFORE   AFTER   • APPLY

DISPLAY ON MOBILE DEVICE (FIG. 10) CHANGES IN SYNCH WITH MAIL DISPLAY (FIG. 9)

CONTROLLING DISPLAY SETTINGS USING MOBILE DEVICE

FIELD OF THE INVENTION

The present application relates generally to controlling settings such as contrast and brightness of a display such as a TV display using a secondary mobile device.

BACKGROUND OF THE INVENTION

User interfaces (UI) for AVDDs such as TVs have been provided in which a person can establish various settings of the AVDD, including video settings such as brightness, contrast, etc. As understood herein, such UI typically are invoked from a settings menu presented onscreen, overlaid onto the video being presented. The user then manipulates the UI to change brightness, contrast, etc. When the user is satisfied he or she exits the settings menu and can view the full screen unimpeded to observe the results of the settings adjustments.

As also recognized herein, onscreen UIs disrupt the viewing experience. Furthermore, the onscreen settings UI distracts from and interferes with the picture adjustment since it obfuscates the image the user is trying to adjust.

SUMMARY OF THE INVENTION

According to principles set forth further below, an audio video display device (AVDD) includes a processor, a video display, and computer readable storage medium bearing instructions executable by the processor. Using the instructions stored on the computer readable storage medium, the processor can receive from a mobile settings control device (MSCD) wirelessly communicating with the AVDD display a settings command input by means of a user interface (UI) presented on a display of the MSCD. The UI provides for user adjustment of display settings commands including, for example, contrast and brightness. The processor applies the display setting command to the video display to thereby change at least one display setting of the video display.

In some embodiments the AVDD sends the UI to the MSCD over a wired path in a home network. In other embodiments the AVDD sends the UI to the MSCD over a wireless path. In still other embodiments the AVDD does not send the UI to the MSCD and the MSCD is vended along with the AVDD.

In non-limiting examples, respective first and second images of at least one video frame before the display setting is applied and after the display setting is applied are presented. The first and second images may be freeze frames or moving video images and they may be presented simultaneously side by side each other or sequentially full screen, in which case they are toggled between automatically at a user-defined toggle rate or manually by the user manipulating the MSCD. The images can be presented on the AVDD, or on the MSCD, in which case the AVDD sends the images to the MSCD for presentation thereof. In this latter example the AVDD may fill one half of a frame buffer with first picture information and may also fill one half of a frame buffer with the same first picture information, sending the information in the frame buffers to the MSCD for presentation thereof in a split screen mode.

In another aspect, a mobile settings control device (MSCD) for establishing display settings of an audio video display device (AVDD) has a processor and a video display controlled by the processor. The processor is programmed to receive a user interface (UI) presenting display settings adjustment elements and receive user input on the UI. The user input establishes at least one change command for a display setting. The processor sends the user input establishing at least one change command for a display setting to the AVDD to thereby cause the AVDD to change an appearance of video on the AVDD in accordance with the change command.

In example embodiments, the MSCD receives the UI from the AVDD over a wired path in a home network. In other embodiments, the MSCD receives the UI from the AVDD over a wireless path. In still other embodiments, the MSCD does not receive the UI from the AVDD and the MSCD is vended along with the AVDD.

In non-limiting implementations respective first and second images of at least one video frame before the change command is applied and after the change command is applied are presented. The first and second images can be freeze frames or live video and may be presented on the AVDD or MSCD. The first and second images can be presented simultaneously side by side each other or sequentially full screen and are toggled between automatically or manually by the user manipulating the MSCD.

The MSCD can include a camera communicating image information imaged from the AVDD to the processor. The processor calibrates video settings of the first image in accordance with the image information imaged from the AVDD and presents a calibrated first image on the display of the MSCD. In the event that the processor receives first and second user inputs simultaneously on the UI establishing respective first and second change commands, the processor sends the first and second change commands in sequence to the AVDD according to a predetermined setting order.

In another aspect, a method for establishing at least one display setting on an audio video display device (AVDD) using a mobile setting control device (MSCD) includes one or more of the following. The method can include allowing a user to select from first and second selections, with the first selection being to present first and second images for setting establishment comparison on the AVDD and the second selection being to present first and second images for setting establishment comparison on the MSCD. The first image applies an old display setting, and the second image applies a user-established new setting.

In addition or alternatively, the method may include allowing a user to select from first and second selections. The first selection can be to present first and second images for setting establishment comparison simultaneously in split screen format, while the second selection can be to present first and second images for setting establishment comparison sequentially in full screen format. The first image applies an old display setting, and the second image applies a user-established new setting.

In addition or alternatively, the method may include allowing a user to select from first and second selections. The first selection can be to present first and second images for setting establishment comparison sequentially in full screen format with the user toggling between the images. In contrast, the second selection can be to present first and second images for setting establishment comparison sequentially in full screen format with automatic toggling between the images. The first image applies an old display setting, and the second image applies a user-established new setting.

In addition or alternatively, the method may include allowing a user to select from first and second selections. The first selection may be to present first and second freeze frame images for setting establishment comparison, while the second selection may be to present first and second moving video images for setting establishment comparison. The first image applies an old display setting, and the second image applies a user-established new setting.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3-7 are screen shots illustrating various principles;

DETAILED DESCRIPTION OF THE PREFERRED EMBODIMENT

Figure 1:
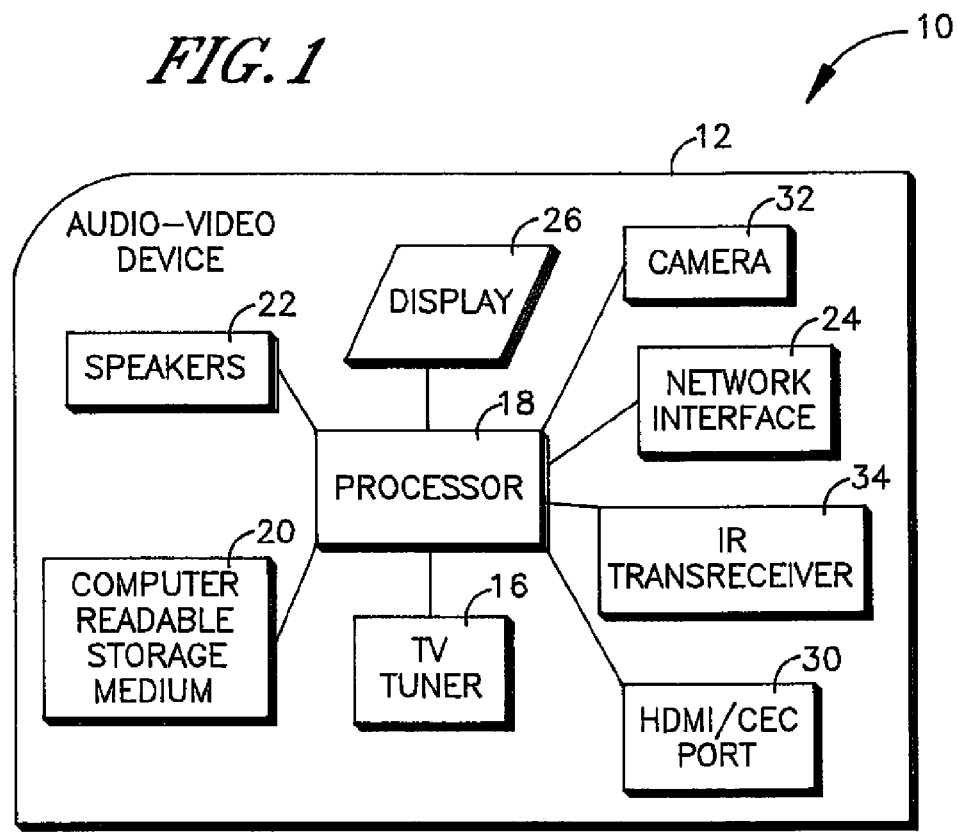
FIG. 1 is a block diagram of a non-limiting example system in accordance with present principles.
Figure 1:
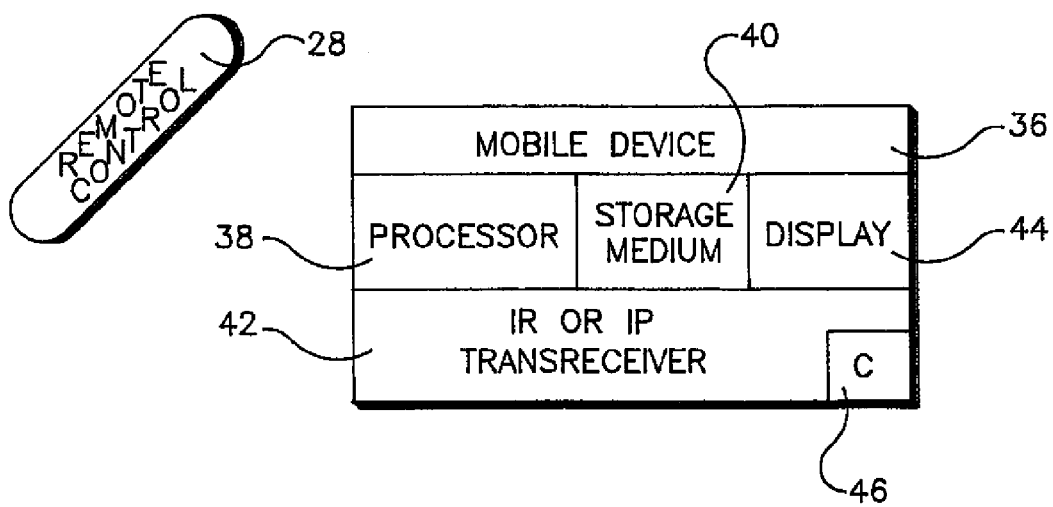

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless network interface 24 (such as a modem or router) communicating with the processor 12 which may execute a software-implemented browser.

Video is presented under control of the TV processor 18 on a TV display 26 such as but not limited to a high definition TV (HDTV) flat panel display. The display 26 may be a three dimensional (3D) TV display that presents simulated 3D images to a person wearing 3D glasses watching the TV or otherwise, e.g., using holograms or other 3D technology. For example, the display 26 may be an autostereoscopic display, or active shuttered 3D glasses that the viewer wears to view a sequential display 26 is also contemplated.

User commands to the processor 18 may be wirelessly received from a remote control (RC) 28 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources as received by a terrestrial broadcast antenna which communicates with the AVDD 12 may be presented on the display 26 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end may also be received at the TV for presentation of TV signals on the display 26 and speakers 22. When basic cable only is desired, the cable from the wall typically carries TV signals in QAM or NTSC format and is plugged directly into the "F-type connector" on the TV chassis in the U.S., although the connector used for this purpose in other countries may vary. In contrast, when the user has an extended cable subscription for instance, the signals from the head end are typically sent through a STB which may be separate from or integrated within the TV chassis but in any case which sends HDMI baseband signals to the TV when the source is external to the TV. Other types of connections may be used, e.g., MOCA, USB, 1394 protocols, DLNA.

Similarly, HDMI baseband signals transmitted from a satellite source of TV broadcast signals received by an integrated receiver/decoder (IRD) associated with a home satellite dish may be input to a HDMIICEC port 30 of the AVDD 12 for presentation on the display 26 and speakers 22. Also, streaming video may be received from the Internet for presentation on the display 26 and speakers 22. The streaming video may be received at the network interface 24 or it may be received at an in-home modem that is external to the AVDD 12 and conveyed to the AVDD 12 over a wired or wireless Ethernet link and received at an RJ45 or 802.11x antenna on the TV chassis.

Also, in some embodiments one or more cameras 32, which may be video cameras integrated in the chassis if desired or mounted separately and electrically connected thereto, may be connected to the processor 18 to provide to the processor 18 video images of viewers looking at the display 26. The one or more cameras 32 may be positioned on top of the chassis of the AVDD, behind the display and looking through display, or embedded in the display.

The processor 16 may also communicate with an infrared (IR) or radiofrequency (RF) transceiver 34 for signaling to a mobile settings control device (MSCD) 36. The MSCD 36 may include a MSCD processor 38 accessing a computer readable storage medium 40 and communicating signals to and from the AVDD 12 through a communication interface 42 such as a transceiver configured to communicate with the transceiver 34 of the AVDD 12. The transceivers 34, 42 may be, without limitation, WiFi transceivers, Bluetooth transceivers, etc.

As set forth further below, in some embodiments the AVDD 12 can communicate user interfaces (UI) to the MSCD 36 for presentation of the UI on a display 44 of the MSCD 34 and subsequent user input to the UI of various settings for the AVDD 12, including video settings. The display 44 may be a touch screen display. The MSCD 36 may also have one or more cameras 46 communicating image information to the MSCD processor 38, including image information imaged from the AVDD display 26, for purposes to be shortly disclosed.

Figure 2:
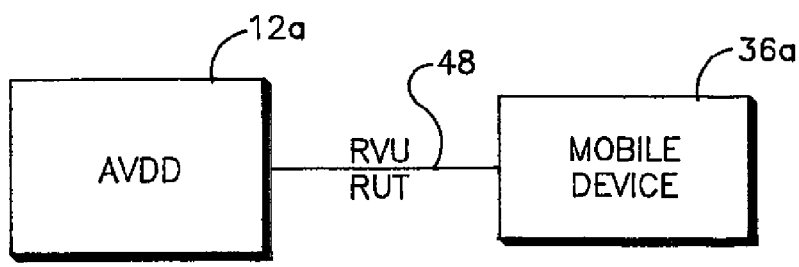
FIG. 2 is a simplified block diagram of another non-limiting example system in accordance with present principles.

The MSCD 36 can be a special purpose device provided by a manufacturer of the AVDD 12 along with vending the AVDD 12 or thereafter. Or, the MSCD 36 may be, without limitation, any portable device such as a smart phone, laptop or tablet computer, portable game console, and the like. Yet again, as shown in FIG. 2 in another alternate embodiment an MSCD 36*a* may communicate with an AVDD 12*a* over a wired link 48 in a home network, in which UIs are provided from the AVDD 12*a* to the MSCD 36*a* over the wired link 48 using, for example, digital living network architecture (DLNA) principles known in the art such as RVU principles in which remote user interfaces (RUI) may be employed, albeit to date not the UIs envisioned herein or for the purposes envisioned herein. The components 12*a*, 36*a* shown in FIG. 2 may otherwise be in all essential respects identical to the components 12, 36 shown in FIG. 1, with the exception of, e.g., certain below-described code that attends to non-DLNA transmission of UIs to the MSCD 36.

As used herein, "display setting" does not include mere channel currently tuned to but does include video presentation settings including contrast, sharpness, brightness, color, hue, backlight, picture, temperature, noise reduction, as well as advanced settings such as black corrector (on or off), gamma (on or off), clear white (on or off), color space (wide or narrow), live color (on or off), detail enhancer (on or off), edge enhancer (on or off), white balance, and both gain and bias values for red, green and blue pixels. Note that the above settings are example settings for a Sony Bravia (trademark) TV; other AVDDs may use different nomenclature or may have some differences in the type of display settings that can be adjusted.

FIGS. 3-6 show screen shots of example UIs that can be presented on the display 26 of the AVDD 12 to allow a user to enter certain preferences. It is to be understood, however, that one or more of the screen shots can alternately be presented on the display 44 of the MSCD 36 by communicating the UIs from the AVDD 12 to the MSCD 36 using the transceivers 34, 42, or using the wired link 48 in the embodiment of FIG. 2, or simply by programming the MSCD 36 with the UIs at manufacture in embodiments in which the MSCD 36 is vended with the AVDD 12.

FIG. 3 accordingly illustrates relevant components of a settings UI 50 in which the user is given the choice of using the local device (in this case, the AVDD 12) to adjust display settings, or using the mobile device (MSCD 36) to adjust display settings. Assuming the user selects to use the MSCD 36, the screen shot of FIG. 4 may appear in which a UI 52 gives the user the choice of selecting whether to display the below-described "before" and "after" images on the display 26 of the AVDD 12 (labeled "TV" in FIG. 4) or on the display 44 of the MSCD 36. In some embodiments the user may further select to present the below-described "before" and "after" images on both the display 26 of the AVDD 12 (labeled "TV" in FIG. 4) and on the display 44 of the MSCD 36.

Figure 9:
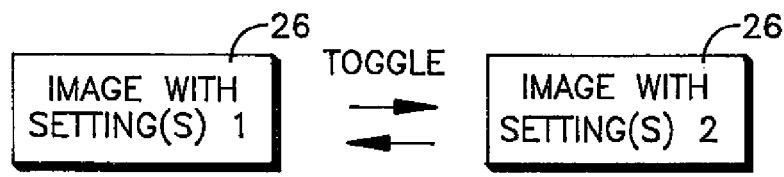
FIG. 9 is a schematic view illustrating the display of the AVDD toggling between two images of different settings.
Figure 10:
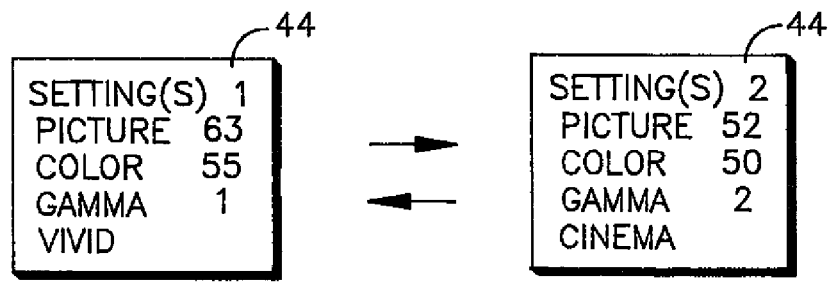
FIG. 10 is a schematic view illustrating the display of the MSCD toggling in synchronization with the AVDD display toggling in FIG. 9.

After selecting which display or displays to present the before and after images, the UI 54 of FIG. 5 may appear, giving the user the option of selecting to have the before and after images presented simultaneously side by side each other (or equivalently, top and bottom) or to have the before and after images presented individually, sequentially one after the other, each substantially full screen. In the latter case, the display toggles between the before and after images, and should the user select this option, the user may also select whether to toggle manually using a key on the MSCD 36, or whether to have the relevant processor toggle between the two images automatically, if desired at a user-defined rate input by the user at field 56, e.g., toggle every two seconds. When the user has selected to have the images toggle and to have the images presented on both displays, the displays are synchronized, such that whatever image appears on one display simultaneously appears on the other display. Or, briefly referring to FIGS. 9 and 10, respectively showing the AVDD display 26 and MSCD display 44, as the AVDD toggles between two images having different settings as shown, the MSCD display 44 in FIG. 10 shows the settings associated with the screen shots in FIG. 9. Thus, as the AVDD toggles between the two different images shown in FIG. 9, the corresponding settings used to create the two different settings are shown toggling in synchronization therewith on the MSCD.

In addition to the above user preference UIs, FIG. 6 shows a UI 58 that may be presented to enable a user to select whether the before and after comparison images are to be freeze frames or moving video, i.e., whether the comparison images to be each a single frame of video or a sequence of video frames presented at the normal rate of around thirty frames per second. The user may also be given the option, as indicated at 60, to select a particular frame number to use as the comparison image. As understood herein, it is possible for users to obtain information as to particular frame numbers or even particular frame locations (e.g., "first frame in chapter 5" of a disk-borne video stream) and should the user so desire, a particular frame may be selected, it being understood that additional fields may be provided to identify the file or video stream from the frame number identified at 60 may be obtained.

Once the user preferences have been entered, the UI 62 shown in FIG. 7 may be presented on the display 44 of the MSCD 36. As shown, the example UI 62 has three selector elements 64, 66, 68 in the form of draggable fill bars labeled "color", "brightness" and "contrast". It is to be understood that greater or fewer selector elements may be provided to enable the user to establish one or more of the above-defined example display settings, that selector elements other than fill bars may be used, that additional pages of selector elements may be presented depending on the number of display settings that are envisioned for user establishment, and that input devices to establish particular settings may be used other than a touch screen display. However, in the example shown it is to be appreciated that the user need simply drag his or her finger on one or more fill bars 64-68 to move the bar up or down as desired to raise or lower the respective display setting.

As also indicated at 70, numeric values of the current settings may also be presented for the user's edification. A text instruction 72 can also be presented instructing the user how to manipulate the UI 62 to establish display settings of the AVDD 12.

FIG. 7 also shows before and after images 74, 76 that are presented side by side on the display 44 of the MSCD 36. Thus, in the example shown, the user has selected from the UI 50 (FIG. 3) to use the MSCD 36 as the display settings control device, has selected from the UI 52 (FIG. 4) to present the images 74, 76 on the MSCD 36, has selected from the UI 54 (FIG. 5) to show the images in the split screen format illustrated, and has selected from the UI 58 (FIG. 6) to use freeze frames as the comparison images 74, 76. Of course, had the user selected, for example, "alternating full screen" from the UI 54 of FIG. 5, only one of the images 74, 76 would appear in the entire area occupied by both of the images 74, 76, then after toggling the other image 76, 74 would appear, etc. And had the user selected to present the images 74, 76 on the AVDD 12, the images 74, 76 would appear as per the user preferences (freeze frame or moving video, split screen or full screen toggle) on the display 26 of the AVDD 12 while the remainder of the UI 62 would still appear on the display 44 of the MSCD 36.

Turning to the images 74, 76, regardless of where or how appearing the before image 74 is generated by applying the old (i.e., existing or current) display settings, whereas the after image 74 is generated by applying the results of the user-established new setting as input using the selector element(s) 64-68. Note that the images 74, 76 are identical in that they show the same scene or picture, with the exception that one image is presented using a first set of display settings whereas the other image is presented using another set of display settings. In this way, the user can view the effects of the changes being made using the UI 62 to the picture being presented on the AVDD 12. Once the user is satisfied with the display settings, he or she can click on an "apply" selector 78 of the UI 62 to cause the MSCD 36 to send the values of the new settings to the AVDD 12, which then applies them to the display 26 of the AVDD 12.

Thus, in an example embodiment the AVDD 12 does not apply new settings to the display 26 until the user selects "apply". In this way, the user may view both images 74, 76 in the user-preferred manner and particularly when the images 74, 76 are presented on the display 44 of the MSCD 36, in a manner that is completely transparent to viewers of the AVDD 12.

Should multiple users employ multiple MSCDs to change display settings of the AVDD 12 simultaneously or, e.g., within a predetermined period of time of each other (say, within five minutes of each other), the AVDD 12 can average the new settings from the plural MSCDs and apply the average setting.

Figure 8:
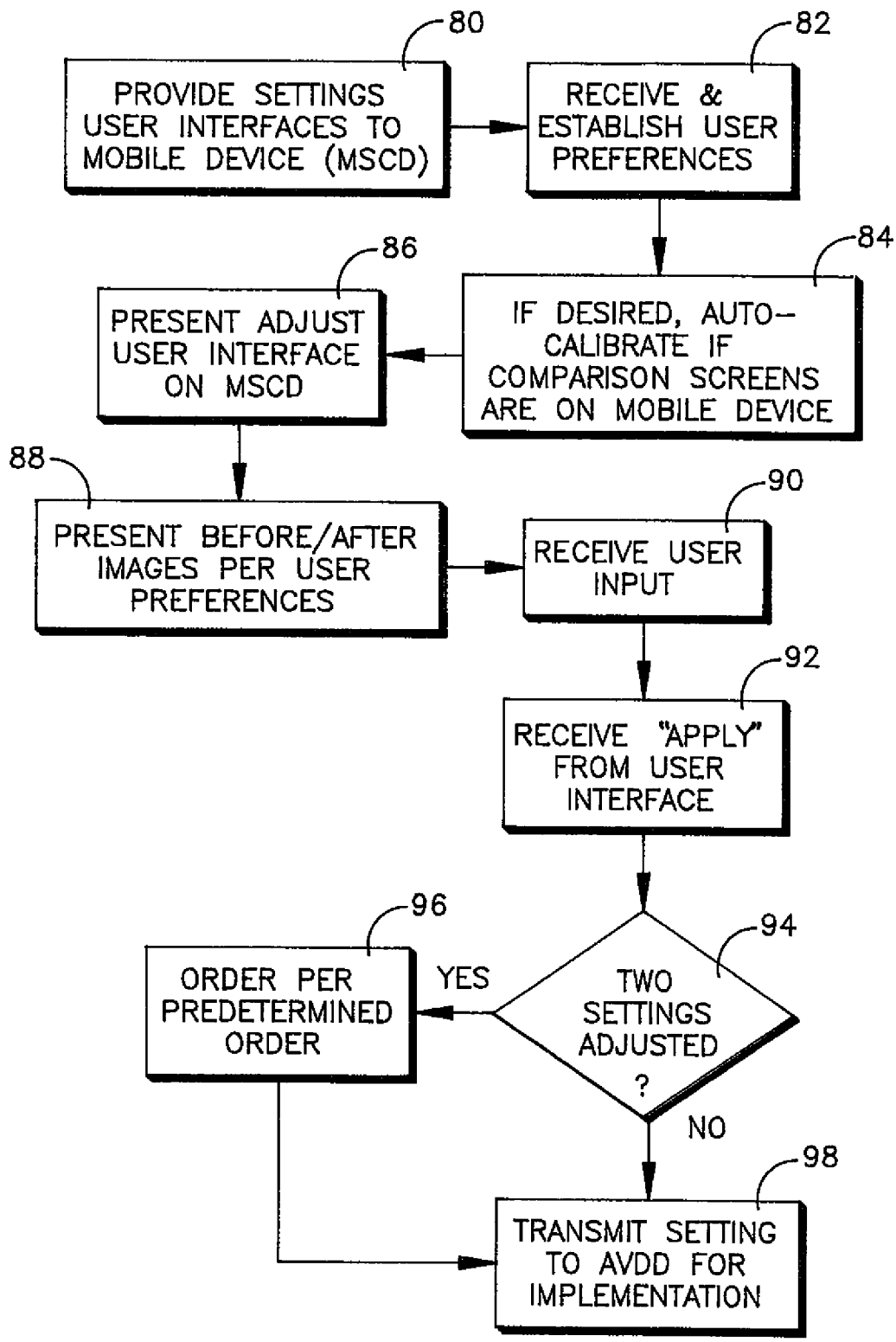
FIG. 8 is an example flow chart of logic according to present principles.

FIG. 8 shows example logic according to present principles. Commencing at block 80, some or all of the settings UIs described above are provided to the MSCD 36. For example, the UI 62 of FIG. 7 is provided to the MSCD 36 and if, as intimated above, the user preference setup is desired to be executed on the MSCD 36 in lieu of or in addition to the AVDD 12, then the UIs of FIGS. 3-6 are also provided to the MSCD 36.

The provision of the UIs may be, as divulged earlier, one of three example ways. The UIs may be wirelessly transmitted from the AVDD 12 to the MSCD 36 using the transceivers 34, 42. Or, the UIs may be sent over the wired link 48 shown in FIG. 2 according to the DLNA protocols disclosed. Yet again, particularly when the MSCD 36 is a dedicated device vended with the AVDD 12, the UIs may be preprogrammed into the MSCD 36 in the factory, with no need to subsequently provide them to the MSCD 36 from the AVDD 12.

Proceeding to block 82, when user preferences are incorporated they are received and established according to the descriptions of FIGS. 3-6. Moving to block 84, If desired the display 44 of the MSCD 36 can be automatically calibrated when the before and after comparison images have been selected to be presented on the display 44 of the MSCD 36 as opposed to the display 26 of the AVDD 12, With greater specificity, assume the current image on the AVDD 12 is the image desired to have one or more video display settings altered. The current image is provided to the MSCD 36 as is an image of the current image on the AVDD as imaged by the camera 46 in FIG. 1. That is, the camera 46 images the display 26 of the AVDD 12 and compares that image to the same mirror image being presented on the display 44 of the MSCD 36. If both displays are more or less identical in configuration and operation the images should match, since they have been produced with the same numerical video display settings. But in the likelier event that despite being produced using the same numerical video display settings, owing to display manufacturing differences the image on the AVDD 12 perhaps is a bit lighter, as an example, than the image presented on the MSCD 36 or otherwise appears as though it is has slightly different numerical video display settings, the MSCD 36 can calibrate its display settings accordingly. In this regard, the AVDD 12 not only provides the image to the MSCD 36 but also its numerical video display settings so that the MSCD 36 can increase or decrease its internal calibration for its numerical video display settings accordingly. Thus, for instance, if the MSCD 36 notes that its image (as internally determined by the processor 38 or as also imaged by the camera 46) is slightly darker than the image taken by the camera of the image on the AVDD 12, it can calibrate its brightness setting to be slightly higher than the brightness setting sent to it by the AVDD 12.

Proceeding to block 86, the UI 62 of FIG. 7 is presented on the display 44 of the MSCD 36. Moving to block 88, the before and after images are presented on the AVDD 12 or MSCD 36 as appropriate for the user preferences discussed above. Note that in presenting the after image, initially, prior to reception of user display setting changes, the before image will be identical to the after image.

In the example shown in FIG. 7 in which the user has elected to show before and images on the MSCD 36 simultaneously in split screen mode, the AVDD 12 can fill one half of a frame buffer with a subset of pixel date from the selected image, since the entire image is not to be presented but only a smaller version thereof, and then fill the other half of the frame buffer with the same pixel data, sending the data in the now-full frame buffer to the MSCD 36. The MSCD 36 thus receives a full, complete frame buffer information that contains two identical images each smaller than the original image from which they were derived.

User input from the UI 62 is received at block 90 and the "after" image (in the example shown in FIG. 7, the image 76) is altered accordingly. When the user has selected to present the before and after images on the AVDD 12, the MSCD 36 sends, via the transceivers 42, 34 or wired link 48, the changed setting information to the AVDD 12. The user can then compare the before and after images to see which one he or she prefers. The logic at blocks 88 and 90 can be repeated as long as the user manipulates the UI 62 on the MSCD 36 without disturbing the image being presented on the AVDD 12, at least when the user has selected to view the images on the MSCD 36 and not the AVDD 12. Eventually, once the user is satisfied with the changed display settings, at block 92 the user selects the "apply" selector 78 in FIG. 7, causing the logic to move from block 92 to decision diamond 94.

As indicated by decision diamond 94, in the event that the user has changed multiple display settings, e.g., in the event that the user has changed both "brightness" and "contrast", the logic proceeds to block 96, wherein the processor 38 of the MSCD 36 orders the settings commands for transmission to the AVDD 12 using, if desired, a predetermined hierarchy of settings. For example, some displays may function better if "brightness" is adjusted prior to "contrast", and in this hypothetical, any changes to the "brightness" setting are ordered to be transmitted and applied prior to any changes in "contrast".

From block 96 or from decision diamond 94 if only a single setting was changed prior to receiving the "apply" command, the logic moves to block 98. At block 98 the settings changes are sent from the MSCD 36 to the AVDD 12 according, if appropriate, to the ordering established at block 96, along with a command to the AVDD 12 apply the changes and exit video display setting mode.

While the particular CONTROLLING DISPLAY SETTINGS USING MOBILE DEVICE is herein shown and described in detail, it is to be understood that the subject matter which is encompassed by the present invention is limited only by the claims.

What is claimed is:

1. Audio video display device (AVDD) comprising:
  processor configured for controlling a video display; and
  computer readable storage medium bearing instructions executable by the processor to configure the processor to:
  receive from a mobile settings control device (MSCD) communicating with the AVDD display at least one settings command input by means of a user interface (UI) presented on a display of the MSCD and providing for user adjustment of display settings commands including at least contrast and brightness; and
  apply the at least one display setting command to the video display to thereby change at least one display setting of the video display, wherein respective first and second images of at least one video frame before the at least one display setting is applied and after the at least one display setting is applied are presented and wherein the first and second images are presented on the AVDD and on the MSCD, and the presentation of the images on the AVDD is synchronized with the presentation of the images on the MSCD.

2. The AVDD of claim 1, wherein the AVDD sends the UI to the MSCD over a wired path in a home network.

3. The AVDD of claim 1, wherein the AVDD sends the UI to the MSCD over a wireless path.

4. The AVDD of claim 1, wherein the AVDD does not send the UI to the MSCD and the MSCD is vended along with the AVDD.

5. The AVDD of claim 1, wherein the first and second images are freeze frames.

6. The AVDD of claim 1, wherein the first and second images are moving video images.

7. The AVDD of claim 1, wherein the first and second images are presented simultaneously side by side each other.

8. The AVDD of claim 1, wherein the first and second images are presented sequentially full screen and are toggled between.

9. The AVDD of claim 1, wherein the first and second images are presented sequentially full screen and are toggled between automatically at a user-defined toggle rate.

10. The AVDD of claim 1, wherein the first and second images are presented sequentially full screen and are toggled between manually by the user manipulating the MSCD.

11. Audio video device (AVD) comprising:
processor configured for controlling a first display; and
computer readable storage medium bearing instructions executable by the processor to configure the processor to:
receive from a mobile settings control device (MSCD) communicating with the display at least one settings command input by means of a user interface (UI) presented on a display of the MSCD and providing for user adjustment of display settings commands including at least contrast and brightness; and
apply the at least one display setting command to the first display to thereby change at least one display setting of the first display, wherein respective first and second images of at least one video frame before the at least one display setting is applied and after the at least one display setting is applied are presented and wherein the first and second images are presented on the MSCD, and the AVD sends the images to the MSCD for presentation thereof.

12. The AVD of claim 11, wherein the AVD fills one half of a frame buffer with first picture information and also fills one half of a frame buffer with the first picture information, sending the information in the frame buffers to the MSCD for presentation thereof in a split screen mode.

13. A mobile settings control device (MSCD) for establishing display settings of an audio video display device (AVDD) comprising:
a processor configured to control a video display;
the processor being programmed to configure the processor to:
receive a user interface (UI) presenting display settings adjustment elements;
receive user input on the UI, the user input establishing at least one change command for a display setting; and
send the user input establishing at least one change command for a display setting to the AVDD to thereby cause the AVDD to change an appearance of video on the AVDD in accordance with the change command, wherein respective first and second images of at least one video frame before the change command is applied and after the change command is applied are presented, and wherein the first and second images are presented on the MSCD, and the AVDD sends the images to the MSCD for presentation thereof.

14. The MSCD of claim 13, wherein the MSCD receives the UI from the AVDD over a wired path in a home network.

15. The MSCD of claim 13, wherein the MSCD receives the UI from the AVDD over a wireless path.

16. The MSCD of claim 13, wherein the MSCD does not receive the UI from the AVDD and the MSCD is vended along with the AVDD.

17. The MSCD of claim 13, wherein the first and second images are freeze frames.

18. The MSCD of claim 13, wherein the first and second images are moving video images.

19. The MSCD of claim 13, wherein the first and second images are presented simultaneously side by side each other.

20. The MSCD of claim 13, wherein the first and second images are presented sequentially full screen and are toggled between.

21. The MSCD of claim 13, wherein the first and second images are presented sequentially full screen and are toggled between automatically at a user-defined toggle rate.

22. The MSCD of claim 13, wherein the first and second images are presented sequentially full screen and are toggled between manually by the user manipulating the MSCD.

23. The MSCD of claim 13, wherein the first and second images are presented on the AVDD.

24. A mobile settings control device (MSCD) for establishing display settings of an audio video display device (AVDD) comprising:
a processor configured to control a video display;
the processor being programmed with instructions to configure the processor to:
receive a user interface (UI) presenting display settings adjustment elements;
receive user input on the UI, the user input establishing at least one change command for a display setting; and
send the user input establishing at least one change command for a display setting to the AVDD to thereby cause the AVDD to change an appearance of video on the AVDD in accordance with the change command, wherein respective first and second images of at least one video frame before the change command is applied and after the change command is applied are presented, a camera configured for communicating image information imaged from the AVDD to the processor, the processor being programmed for calibrating video settings of the first image in accordance with the image information imaged from the AVDD and presenting a calibrated first image on the display of the MSCD.

25. A mobile settings control device (MSCD) for establishing display settings of an audio video display device (AVDD) comprising:
a processor configured to control a video display;
the processor being programmed with instructions to configure the processor to:
receive a user interface (UI) presenting display settings adjustment elements;
receive user input on the UI, the user input establishing at least one change command for a display setting; and
send the user input establishing at least one change command for a display setting to the AVDD to thereby cause the AVDD to change an appearance of video on the AVDD in accordance with the change command, wherein the processor is programmed to receive first and second user inputs simultaneously on the UI establishing respective first and second change commands, and the processor is programmed to send the first and second change commands in sequence to the AVDD according to a predetermined setting order.

* * * * *